United States Patent
Sugawara et al.

[11] Patent Number: 6,055,122
[45] Date of Patent: Apr. 25, 2000

[54] MAGNETIC RECORDING APPARATUS HAVING A REDUCED THICKNESS

[75] Inventors: Naoto Sugawara; Masatomo Seya; Hiroki Ishida, all of Tokyo, Japan

[73] Assignee: Mitsubishi Denki Kabushiki Kaisha, Tokyo, Japan

[21] Appl. No.: 09/065,583

[22] Filed: Apr. 24, 1998

[30] Foreign Application Priority Data

Sep. 26, 1997 [JP] Japan .................................. 9-262363

[51] Int. Cl.$^7$ .................................................. G11B 5/596
[52] U.S. Cl. ..................................... 360/78.11; 360/77.03
[58] Field of Search ........................... 360/77.03, 78.04, 360/78.11, 75; 369/112, 44.23

[56] References Cited

U.S. PATENT DOCUMENTS 5,121,371   6/1992   Farnsworth et al. ............. 360/77.03 X
5,311,378   5/1994   Williams et al. ..................... 360/77.03
5,999,498   12/1999  Handa et al. .............................. 369/13

FOREIGN PATENT DOCUMENTS 4-219640   8/1992   Japan .

Primary Examiner—Andrew L. Sniezek

[57] ABSTRACT

A holographic unit for applying light to a recording medium comprises an optical path, a first optical diffracting member, a second optical diffracting member, an optical condensing member, a first entrance/exit surface disposed at a predetermined first angle to a first reflecting surface, and a second entrance/exit surface disposed at a predetermined second angle to a second reflecting surface to project a plurality of light beams so that the plurality of light beams fall on a position sensing track formed on a recording medium perpendicularly to the surface of the recording medium.

17 Claims, 5 Drawing Sheets

MAGNETIC RECORDING APPARATUS HAVING A REDUCED THICKNESS

BACKGROUND OF THE INVENTION

1. Field of the Invention

The present invention relates to a magnetic recording apparatus having a reduced thickness. More specifically, the present invention relates to a thin magnetic recording apparatus which facilitates the assembly and adjustment of an optical unit. Further, the present invention relates to an improved technique for positioning a magnetic head assembly by projecting light beams on a disk-shaped recording medium.

2. Background Art

Most disk-shaped recording mediums prevalently used today are 3.5 inch diameter disks having a high track density in the range of about 2100 to 2500 TPI (tracks per inch) and a storage capacity in the range of 100 to 120 M-byte.

The recording medium is provided with a position sensing track for optical tracking servocontrol for positioning a magnetic head assembly relative to the recording medium to achieve recording information in such a high recording density, or erasing or reproducing information. The position sensing track is used for closed-loop optical servocontrol for positioning the magnetic head assembly relative to recording tracks.

FIG. 7 is a diagrammatic view of an optical unit included in a conventional magnetic recording apparatus. Shown in FIG. 7 are a disk-shaped recording medium 50, a position sensing track 50a of a predetermined length formed continuously in concentric circles on one surface of the recording medium 50, a cartridge 50b for protecting the recording medium 50, and a magnetic head assembly 51 for writing information to the recording medium 50, or erasing or reading information recorded on the recording medium 50. The magnetic head assembly 51 is bonded to a support spring 51a and is mounted on a carriage mechanism, not shown, so that its magnetic gap, not shown, slides on a surface of the recording medium 50 provided with the position sensing track 50a.

A light emitting-and-receiving unit 52 is provided with a laser diode 52a (hereinafter abbreviated to "LD" 52a), i.e., a light source, and a photodiode 52b (hereinafter abbreviated to "PD" 52b), i.e., a photodetection device.

A holographic unit 53 is provided with an optical element, not shown, for dividing light emitted by the LD 52a into a plurality of light beams, and an optical element, not shown, for guiding the reflected light reflected from the recording medium 50 to the PD 52b.

Shown also in FIG. 7 are a lens 54 for condensing light rays from the holographic unit 53 and guiding the reflected light to the holographic unit 53, and a mirror 55 for reflecting a light beam traveled through the lens 54 to the recording medium 50 and guiding the reflected light reflected by the recording medium 50 to the lens 54.

The components 52 to 55 constitute an optical unit. The optical unit, the magnetic head assembly 51 and the magnetic head support spring 51a are carried by a carriage mechanism, not shown, for simultaneous movement in directions parallel to the radius of the recording medium 50.

In operation, the recording medium 50 is rotated at a fixed rotating speed by a recording medium drive motor, not shown. The magnetic gap of the magnetic head assembly 51 supported on the head support spring 51a slides on the recording medium 50.

Closed-loop optical servocontrol will be described. Light emitted by the LD 52a is divided into three light beams by the holographic unit 53, the three light beams are condensed by the lens 54, the three condensed light beams fall on the mirror 55, and then the mirror 55 deflects the three light beams toward the recording medium 50.

The position of the light emitting-and-receiving unit 52 is adjusted so that the three light beams are arranged in a direction at a predetermined angle to the position sensing track 50a when the three light beams are projected on the position sensing track 50a.

The three light beams deflected toward the recording medium 50 by the mirror 55 are reflected toward the mirror 55 in reflected light beams of different intensities dependent on a condition in which the three light beams fall on the recording medium 50 or on the position sensing track 50a of the recording medium 50. The mirror 55 deflects the three reflected light beams toward the lens 54, the three reflected light beams travel through the lens 54 to the holographic unit 53, and then the holographic unit 53 guides the three reflected light beams to the PD 52b.

Upon the reception of the three reflected light beams, the PD 52b generates detection signals respectively representing the intensities of the three reflected light beams. A servocontroller, not shown, receives the detection signals from the PD 52b and gives a drive signal to a carriage drive unit, not shown, for driving the carriage mechanism, not shown, according to the contents of the detection signals. The magnetic head assembly (more precisely, the magnetic gap) carried by the carriage mechanism is positioned relative to a predetermined track by closed-loop optical servocontrol.

In the conventional magnetic head assembly thus constructed, the three light beams must be accurately focused on the recording medium 50 (or the position sensing track 50a). Focusing accuracy must be ±50 $\mu$m. Focus adjustment in such an accuracy of ±50 $\mu$m is achieved by adjusting the position of the lens 54. Since the holographic unit 53, the lens 54 and the mirror 55 are separate parts, the positions of those parts relative to each other need fine adjustment taking into consideration the inclination of the lens 54. Thus the focus adjusting work is difficult.

Work for aligning the optical axis of the light beam relative to the position sensing track 50a to enable the light emitting-and-receiving unit 52 to achieve accurate signal detection is very difficult because the light emitting-and-receiving unit 52, the holographic unit 53, the lens 54 and the mirror 55 are separate parts.

Besides position adjustment is difficult, it is also difficult to form the optical unit in a small, thin construction because the holographic unit 53, the lens 54 and the mirror 55 are separate parts and hence the magnetic recording apparatus cannot be formed in a small, thin construction.

Techniques for integrating an optical unit with a holographic unit in a field other than the field of the magnetic recording apparatus are disclosed in JP-A No. 4-219640. However, since those prior art techniques are not those in the field of the magnetic recording apparatus, it is difficult to project a light beam accurately perpendicularly on the position sensing track 50a of the wavering recording medium 50 by those techniques. Therefore, additional parts including mirrors and lenses are necessary for accurately projecting the light beam on the position sensing track 50a and focus adjusting work is difficult.

SUMMARY OF THE INVENTION

The present invention has been made to solve the foregoing problems and it is therefore a primary object of the present invention to provide a thin magnetic recording apparatus employing an integrated optical unit. It is a second object of the present invention is to provide a magnetic recording apparatus capable of simplifying or omitting focus adjustment and optical axis adjustment.

According to one aspect of the present invention, a magnetic recording apparatus comprises a magnetic head assembly for writing information to a disk-shaped recording medium or reading information recorded on the recording medium. An optical unit projects light beams through a light passage formed in the magnetic head assembly on the recording medium and receives reflected light beams reflected from the recording medium. A carriage mounted with the magnetic head assembly and the optical unit moves the magnetic head assembly and the optical unit. A controller drives the carriage on the basis of the intensities of the reflected light beams received by the optical unit to position the magnetic head assembly at a predetermined position.

The optical unit comprises a holographic unit, a light emitting device which projects a light beam on the holographic unit, and a photodetection device which receives the reflected light beams through the holographic unit and gives signals representing the intensities of the received light beams to the controller.

The holographic unit comprises an optical path consisting of a first reflecting surface and a second reflecting surface extended in parallel to the first reflecting surface and capable of making light to travel along a zigzag passage between the first and the second reflecting surface. A first optical diffracting means is disposed on the optical path to produce a plurality of light beams from a light beam emitted by the light emitting device. A second optical diffracting means is disposed on the optical path to deflect the light traveling along the optical path. An optical condensing means is disposed on the optical path to condense the light traveling along the optical path. A first entrance/exit surface is disposed at a predetermined first angle to the first reflecting surface to direct the light emitted by the light emitting device toward the first optical diffracting means. Further, a second entrance/exit surface is disposed at a predetermined second angle to the second reflecting surface to project the plurality of light beams so that the plurality of light beams fall on a position sensing track perpendicularly to the surface of the recording medium.

In another aspect of the present invention, the magnetic recording apparatus further comprises a holding unit for holding the optical unit, and the holding unit is fixed to a support member to which a slider included in the magnetic head assembly is fixed.

In another aspect of the present invention, the magnetic recording apparatus further comprises a focusing adjusting unit for adjusting the position of the holographic unit so that the light beams emitted from the second entrance/exit surface of the holographic unit are focused on the position sensing track of the recording medium.

In another aspect of the present invention, in the magnetic recording apparatus, the focusing adjusting unit is disposed on the holding unit for holding the optical unit.

In another aspect of the present invention, the magnetic recording apparatus further comprises an inclination control means for controlling the inclination of the holographic unit so that the optical axes of the light beams projected through the second entrance/exit surface of the holographic unit on the position sensing track of the recording medium extend at an angle of 90°±1° to the position sensing track.

In another aspect of the present invention, in the magnetic recording apparatus, the inclination control means is included in the focusing adjusting unit.

In another aspect of the present invention, in the magnetic recording apparatus, a plurality of light beams are emitted from the second entrance/exit surface of the holographic unit so as to travel along a straight line, and the positions of the plurality of light beams relative to the position sensing track of the recording medium are adjusted by an alignment adjusting unit.

In another aspect of the present invention, in the magnetic recording apparatus, the alignment adjusting unit is held on the holding unit for holding the optical unit.

In another aspect of the present invention, in the magnetic recording apparatus, the alignment adjusting unit is held on The magnetic recording apparatus according to claim 1, wherein the holographic unit has the shape of a plate and is transparent, and the second entrance/exit surface of the holographic unit lies at a distance in the range of 2.0 mm to 2.5 mm from a sliding surface of the magnetic head assembly.

In another aspect of the present invention, in the magnetic recording apparatus, the alignment adjusting unit is held on The magnetic recording apparatus according to claim 1, wherein the surface of the holographic unit facing the light emitting device excluding the first entrance/exit surface is coated with an antireflection film capable of preventing the reflection of light of a wavelength emitted by the light emitting device.

In another aspect of the present invention, in the magnetic recording apparatus, the alignment adjusting unit is held on The magnetic recording apparatus according to claim 16, wherein the antireflection film is a mat-finished black coating.

Other and further objects, features and advantages of the invention will appear more fully from the following description.

BEST MODE OF CARRYING OUT THE INVENTION

This invention will be described in further detail by way of examples with reference to the accompanying drawings.

FIRST EMBODIMENT

Figure 1:
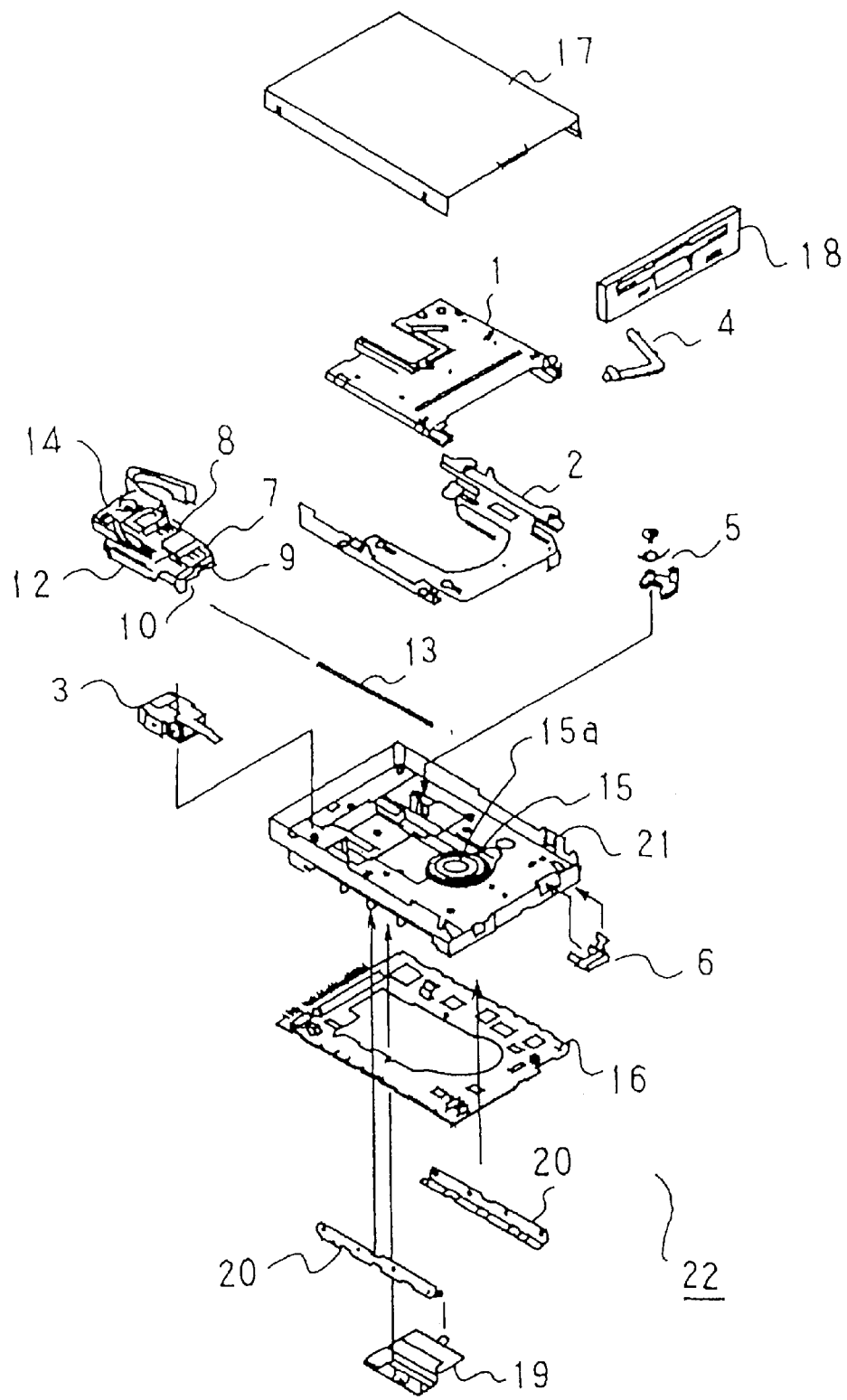
FIG. 1 is an exploded perspective view of a magnetic recording apparatus in the first embodiment of the present invention.
Figure 3:
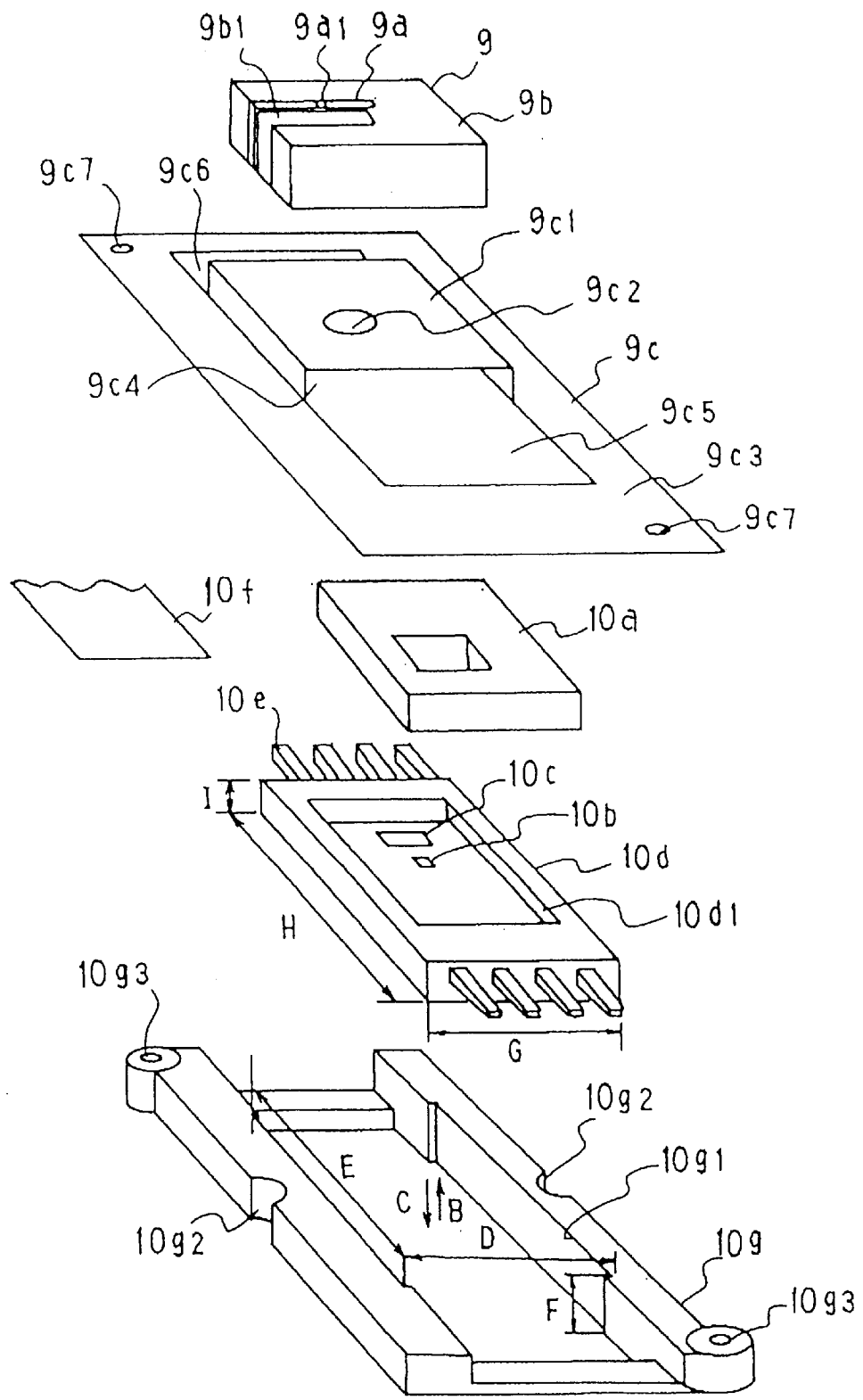
FIG. 3 is an exploded perspective view of the magnetic head assembly of FIG. 2.
Figure 4:
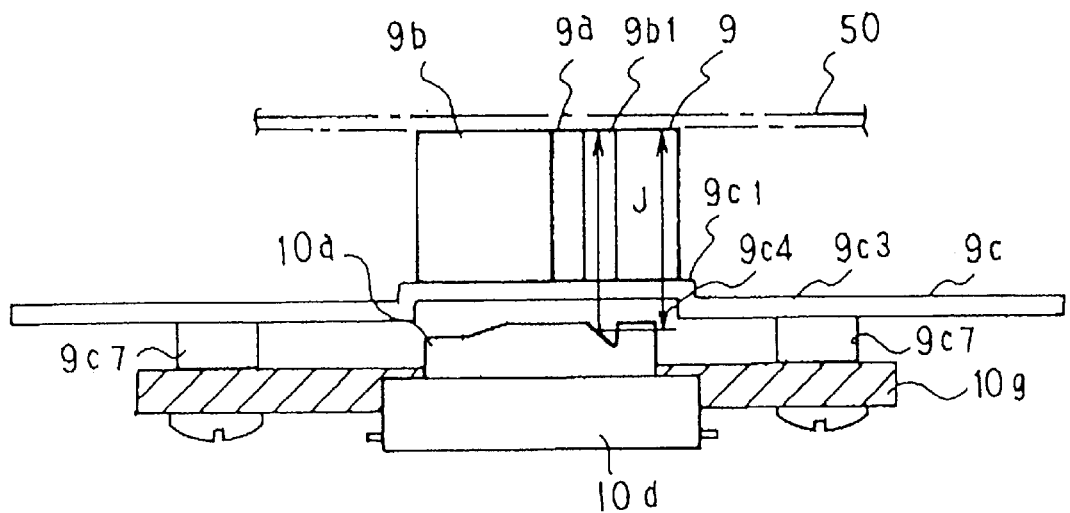
FIG. 4 is a sectional view of the magnetic head assembly taken on line IV–IV' in FIG. 2.

A magnetic recording apparatus in a first embodiment according to the present invention will be described. FIG. 1 is an exploded perspective view of the magnetic recording apparatus in the first embodiment, FIG. 2 is a perspective view of a magnetic head assembly, FIG. 3 is an exploded perspective view of the magnetic head assembly of FIG. 2, and FIG. 4 is a sectional view taken on line IV–IV' in FIG. 2.

Figure 7:
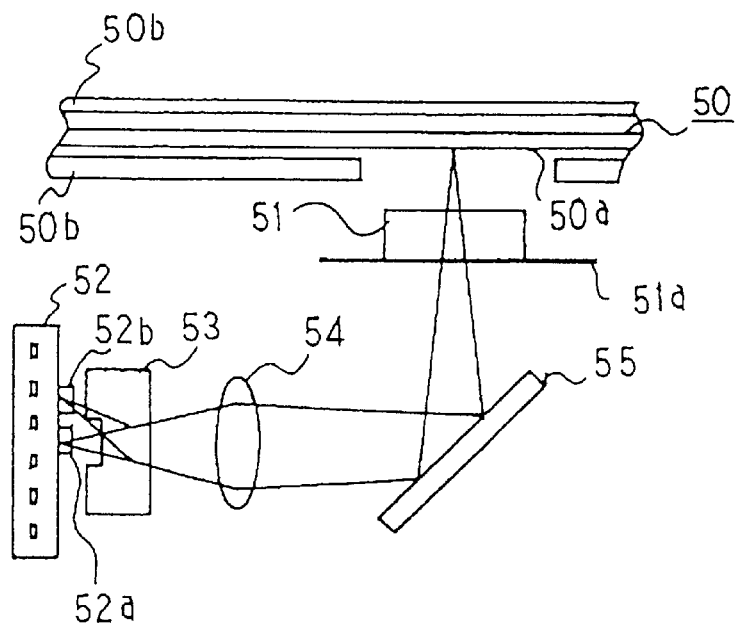
FIG. 7 is a diagrammatic view of an optical unit included in a conventional magnetic recording apparatus.

Referring to FIG. 1, a holder 1 detachably holds the recording medium 50 (FIG. 7). A slide cam 2 moves in directions of loading and unloading of the recording medium, and moves the holder 1 in directions perpendicular to the recording medium toward or away from a frame 21. A loading motor 3 moves the slide cam 2. A shutter opener 4 rotatably supported on a top wall of the holder 1 opens and closes a shutter included in a cartridge 50b (FIG. 7) when loading and unloading the recording medium 50. A latch assembly 5 holds the slide cam 2 at a recording medium loading position for loading the recording medium 50. A button 6 is operated to start operations to eject the recording medium 50. The above components 1 to 6 constitute a loading mechanism for loading and unloading the recording medium 50.

Shown also in FIG. 1, a first magnetic head assembly 7 slides on one surface of the recording medium 50 to write information to the surface or to erase information by magnetizing the surface or to detect magnetic information. A support arm 8 supports the first magnetic head assembly 7 on one end thereof and swingably supported at the other end thereof on a carriage 12. The support arm 8 is biased toward the recording medium 50 by a spring or the like so that the magnetic head assembly 7 is slidable on the recording medium 50.

Figure 2:
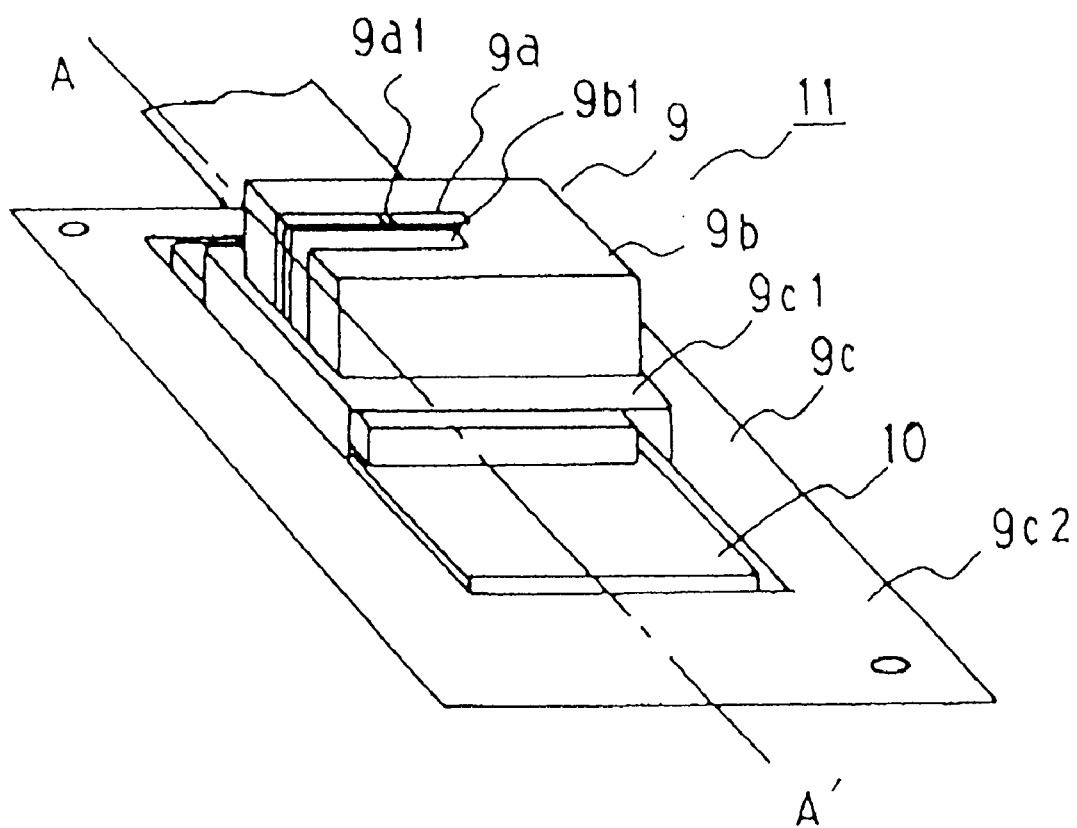
FIG. 2 is a perspective view of a magnetic head assembly.

Referring to FIGS. 1 and 2, a second magnetic head assembly 9 slides on the other surface of the recording medium 50, i.e., the surface provided with the position sensing track 50a shown in FIG. 7, to record or erase information by magnetizing the recording surface or to detect magnetic information therefrom. An optical unit 10 comprises a holographic unit including a lens and an optical diffraction element, a light emitting device, a photodetection device, etc (as described later in detail). The above components 9 and 10 constitute a magnetooptic head assembly 11.

As shown in FIG. 1, the support arm 8, the second magnetic head assembly 9 and the optical unit 10 are mounted on the carriage 12. The carriage 12 moves along a guide shaft 13 along the radius of the recording medium 50. The carriage 12 is driven by a carriage drive motor 14 for movement along the radius of the recording medium 50. The above components 7 to 14 constitute a carriage mechanism.

A recording medium drive motor 15 drives a hub 15a for rotation which holds the recording medium 50 thereon. A controller 16 sends signals to and receives signals from an external system and carries out closed-loop optical servo control operations to control the carriage mechanism and the operation of the recording medium drive motor 15.

As shown also in FIG. 1, a top cover 17, a front cover 18, a bottom cover 19 are provided. A mounting member 20 fixes the magnetic recording apparatus on an external device, not shown. An aluminum frame 21 formed by die casting contains the above components 1 to 20. A magnetooptic recording apparatus 22 comprises the above components 1 to 21.

Next referring to FIGS. 2 and 3, a magnetic core 9a, provided with a magnetic gap 9a1 and a coil (not shown), is holded by a slider 9b of the magnetic head assembly 9. A light beam passage 9b1 is provided in the slider 9b. Light beams from the optical unit 10 travel through the light passage 9b1 for positioning.

A magnetic head support structure 9c fixedly supports the slider 9b. The magnetic head support structure 9c is formed by processing a stainless steel plate, or may alternatively be formed by molding a resin, provided that a sufficient strength is secured.

The magnetic head support structure 9c has a first mount 9c1 having a surface facing the recording medium 50, to which the slider 9b is fixed. An opening 9c2 of a predetermined size is formed in the top wall of the first mount 9c1. Light beams travel through the opening 9c2 for positioning. A second mount 9c3 is formed on the magnetic head support structure 9c to support the optical unit 10 thereby.

A housing space 9c4 is defined by the first mount 9c1 and the second mount 9c3 which are on different levels. The magnetic head support structure 9c is provided with openings 9c5 and 9c6, and threaded holes 9c7 formed in the second mount 9c3. The second magnetic head assembly 9 comprises the above components 9a to 9c7.

A holographic unit 10a comprises a lens, an optical diffraction element and such, and is formed of, for example, a transparent plastic plate of 1.2 mm in thickness, 2 mm in width and 3 mm in length. A light emitting device 10b employs a laser diode. A photodetection device 10c employs a photodiode. The photodetection device 10c is provided with a photodetector and is capable of receiving a plurality of light beams. A light emitting-and-receiving unit 10d is formed by disposing the light emitting device 10b and the photodetection device 10c at predetermined positions. The light emitting-and-receiving unit 10d has an attaching surface 10d1 fixedly bonded to the holographic unit 10a with an adhesive or the like.

Signals are sent out to and received from external devices through terminals 10e electrically connected to the light emitting device 10b and the photodetection device 10c. A flexible cable 10f is connected to the terminals 10e to transmit signals between the optical unit 10 and the controller 16. The light emitting-and-receiving device 10d is held on a holder 10g.

The holder 10g has a focus adjusting portion 10g1 having the shape of a longitudinal groove. The light emitting-and-receiving unit 10d is moved in directions perpendicular to the surface of the recording medium 50 (FIG. 7) provided with the position sensing track 50a, i.e., in the directions of the arrows B and C, to adjust the position of the light emitting-and-receiving unit 10d relative to the recording medium 50 so that the positioning light beam emitted by the optical unit 10 is focused on the position sensing track 50a.

The focus adjusting portion 10g1 is used also as an inclination setting means for setting the inclination of the optical axes of light beams emitted by the optical unit 10 onto the recording medium 50 to the surface of the recording medium 50. The dimensions D, E and F of the focus adjusting portion 10g1 are determined on the basis of the dimensions G, H and I of the light emitting-and-receiving unit 10d so that the optical axis of the light beam extends at an angle of 90°±1° to the surface of the recording medium 50, in which D=G±0.05 mm and E=H±0.05 mm. Thus, the inclination of the light emitting-and-receiving unit 10d can be controlled.

For example, D=4 mm±0.05 mm, E=9 mm±0.05 mm, F=3 mm and, G=4 mm, H=9 mm and I=2 mm.

The holder 10g has alignment adjusting recesses 10g2 formed by recessing portions of side surfaces of the holder 10g. The positions of the alignment adjusting recesses 10g2 on the holder 10g are determined so that the light emitting device 10b is substantially on a line segment connecting the alignment adjusting recesses 10g2. The alignment adjusting recesses 10g2 enables the adjustment of the angular position of the optical unit 10 in a plane perpendicular to the direction of the arrow B or C for the positional adjustment of three light beams projected by the optical unit 10 onto the recording medium 50 and aligned in a straight line. The holder 10g has mounting portions 10g3 provided with through holes through which screws, not shown, are screwed in the threaded holes 9c7.

The optical unit 10 comprises the above components 10a to 10g3.

Referring to FIG. 4, the second entrance/exit surface 10a5 of the holographic unit 10a (shown in FIG. 5 and explained later in detail) is spaced a distance J from the recording medium 50 in the range of 2.0 mm to 2.5 mm.

Figure 5:
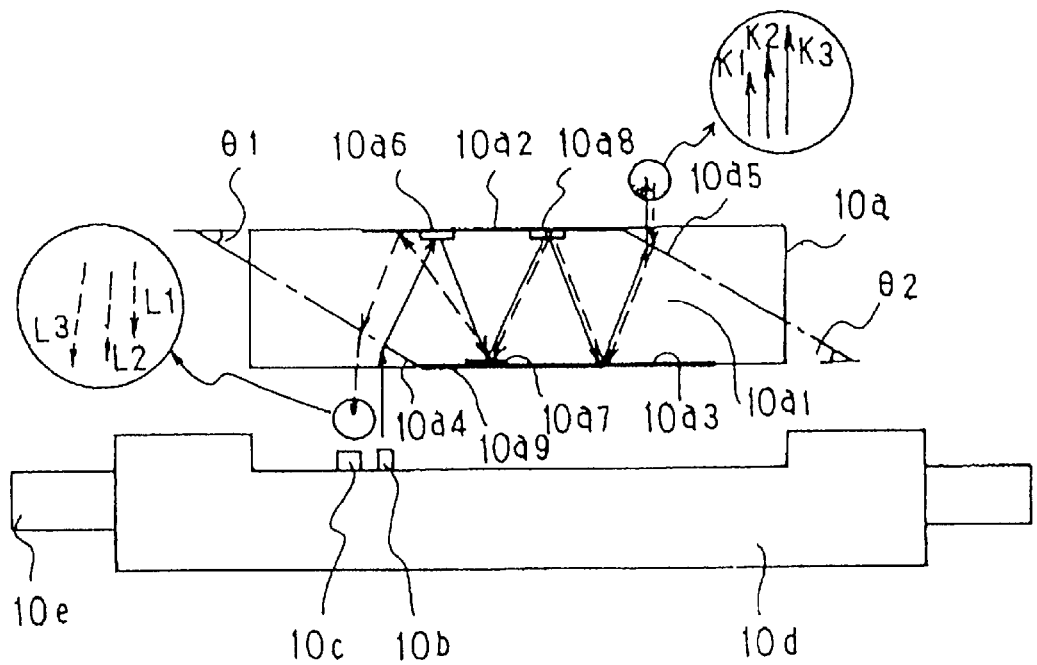
FIG. 5 is a cross sectonal view of a holographic unit and a light emitting-and-receiving unit.

The holographic unit 10a will be described with reference to FIG. 5, in which parts like or corresponding to those shown in FIGS. 2 to 4 are designated by the same reference characters. An optical path 10a1 is defined by a first reflecting surface 10a2 and a second reflecting surface 10a3 of the holographic unit 10a. The first reflecting surface 10a2 and the second reflecting surface 10a3 are parallel to each other and spaced a predetermined distance apart. A light beam fallen on the holographic unit 10a travels zigzag in the optical path 10a1.

A first entrance/exit surface 10a4 is inclined at a first angle θ1 to the first reflecting surface 10a2 and is continuous with the second reflecting surface 10a3. A second entrance/exit surface 10a5 is inclined at a second angle θ2 to the second reflecting surface 10a3 and is continuous with the first reflecting surface 10a2. The first angle θ1 and the second angle θ2 are, for example, 34°.

A first diffraction grating 10a6 is disposed in the optical path 10a1 to produce three light beams from a light beam emitted by the light emitting device 10b. The first diffraction grating 10a6 is provided with, for example, rectangular grooves of 0.05 μm in depth arranged at pitches of 13.1 μm. A second diffraction grating 10a7 serves as a beam splitter which reflects a zero-order reflected light beam among the three light beams reflected from the first diffraction grating 10a6 toward a Fresnel lens 10a8, and reflects a first-order light beam among the three light beams received from the recording medium 50 (FIG. 7) toward the first reflecting surface 10a2.

An antireflection film 10a9 prevents the reflection of light of a wavelength equal to that of the light emitted by the light emitting device 10b. The antireflection film 10a9 is a flat black coating formed on a surface facing the light emitting device 10b of the holographic unit 10a excluding the first entrance/exit surface 10a4. The flat black coating is able to prevent substantially perfectly the reflection of the light of 8,000 Å in wavelength emitted by the light emitting device 10b. The mat finish of the black coating enhances the antireflection effect of the antireflection film 10a9.

Three positioning light beams K1, K2 and K3 emitted by the holographic unit 10a toward the recording medium 50 are aligned in a straight line. The positioning light beams K1, K2 and K3 are perpendicular to the surface of the recording medium 50 provided with the position sensing track 50a. Three reflected light beams L1, L2 and L3 reflected from the recording medium 50 travel from the holographic unit 10a toward the photodetection device 10c.

Figure 6:
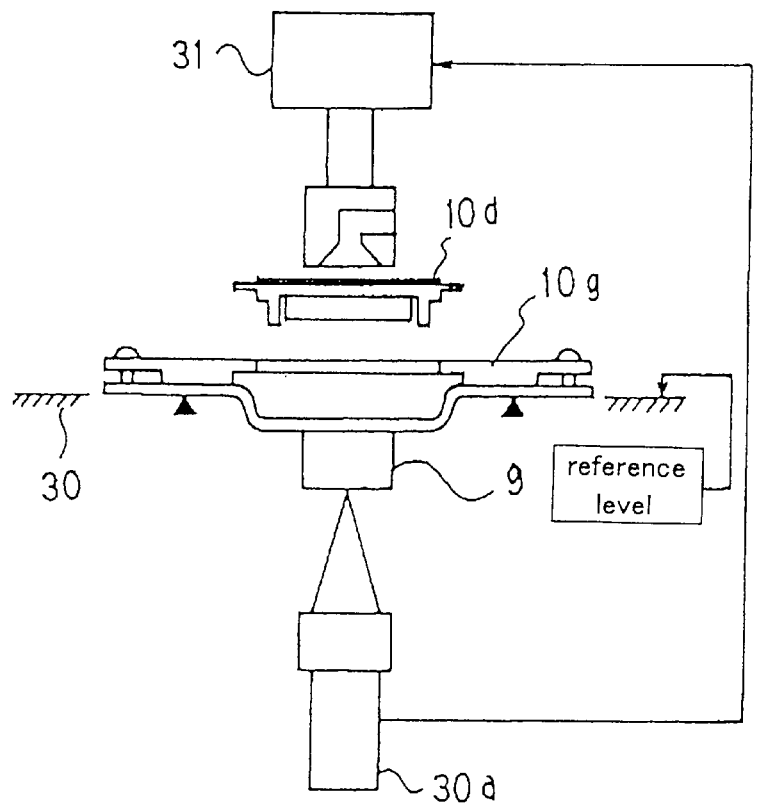
FIG. 6 shows a focus adjusting operation carried out by an optical unit.

Next, operations of this apparatus will be described with reference to the drawings. First a focus adjusting operation to be carried out by the optical unit 10 will be described with reference to FIG. 6.

The magnetic head support structure 9c supporting the second magnetic head assembly 9 is set on a focus adjusting jig 30 with the sliding surface of the second magnetic head assembly 9 faced down. Then, the holder 10g is put on the magnetic head support structure 9c and the second magnetic head assembly 9. Then, screws are screwed through the through holes of the mounting portions 10g3 into the threaded holes 9c7 to fasten the holder log temporarily to the second mount 9c3.

Then, the light emitting-and-receiving unit 10d held by a suction chuck on a handling device 31 is inserted in the focus adjusting portion 10g1 (FIG. 3), and the light emitting device 10b is actuated to emit a light beam.

Then, the light beam emitted by the light emitting device 10b is divided into the three light beams K1, K2 and K3 by the holographic unit 10a. The three light beams K1, K2 and K3 travel through the light passage 9b of the second magnetic head assembly 9 set on the focus adjusting jig 30. Then, a beam analyzer 30a measures the focal length and the diameters of spots and gives measured data to the handling device 31. The handling device 31 moves the light emitting-and-receiving unit 10d vertically, i.e., in the direction of the arrow B or C in FIG. 3, according to the measured data given thereto to position the light emitting-and-receiving unit 10d by adjusting the focal length so that the light beams K1, K2 and K3 form spots of the least diameters. The light emitting-and-receiving unit 10d is bonded fixedly to the focus adjusting portion 10g1 with an adhesive or the like.

The focus adjusting portion 10g1 serve also as an inclination setting means for setting the inclination of the optical axis in the focus adjusting operation, and hence the inclination of the optical axis is adjusted so that the optical axis extends at an angle of 90°±1° to the surface of the recording medium 50 provided with the position sensing track 50a. The inclination of the light emitting-and-receiving unit 10d may be measured by measuring the positions of the spots by the beam analyzer 30a when the handling device 31 is moved vertically and the inclination may be controlled.

An alignment adjusting operation for adjusting the alignment of the optical unit 10 will be described hereinafter. After the focus adjustment has been completed and the light emitting-and-receiving unit 10d has been fixed to the focus adjusting portion 10g1, pins, not shown, having a diameter substantially equal to that of a circle fitting the alignment adjusting recesses 10g2 (FIG. 3) are fitted in the alignment adjusting recesses 10g2 to adjust the angular position of the light emitting-and-receiving unit 10d held on the holder 10g. Then, a light beam is emitted by the light emitting device lob, and the holographic unit 10a produces the three light beams K1, K2 and K3 (FIG. 3) from the light beam emitted by the light emitting device 10b.

Then, the beam analyzer 30a measures the respective positions and relative positions of the light beams K1, K2 and K3, and gives measured data to the handling device 31. The handling device 31 makes the fine adjustment of the angular position of the light emitting-and-receiving unit 10d on the basis of the measured data given thereto so that the measured position of the light emitting-and-receiving unit 10d coincides with a predetermined position.

After the measured data provided by the beam analyzer 30a has coincided with data on the predetermined position, the screw is screwed firmly into the threaded holes 9c7 to fasten the holder 10a firmly to the second magnetic head assembly 9.

Then, the second magnetic head assembly 9 is set on an azimuth adjusting jig, not shown, to adjust the azimuth of the magnetic gap 9a1 relative to the recording tracks, not shown, and then the second mount 9c3 (FIG. 2) is bonded to the carriage 12 (FIG. 1) with an adhesive or the like.

Next, the operation of the magnetooptic head assembly 11 will be described with reference to the drawings. Firstly with reference to FIG. 5, light rays emitted by the light emitting device 10b are refracted at a first refraction angle of 12.5° at the first entrance/exit surface 10a4 of the holographic unit 10a, and travel in the optical path 10a1 toward the first diffraction grating 10a6 disposed on the first reflecting surface 10a2. The reflection of light rays falling on regions of the surface other than the first entrance/exit surface 10a4 among the light rays emitted by the light emitting unit 10b is prevented substantially perfectly by the antireflection film 10a9 and hence those light rays do not affect the photodetection device 10c adversely.

The first diffraction grating 10a6 produces the three light beams K1, K2 and K3 aligned in a straight line from the light rays fallen thereon and sends the three light beams K1, K2 and K3 to the beam splitter 10a7 disposed on the second reflecting surface 10a3. The beam splitter 10a7 sends the zero-order reflected light of each of the three light beams K1, K2 and K3 to the Fresnel lens 10a8 disposed on the first reflecting surface 10a2.

Then, the three light beams K1, K2 and K3 are condensed by the Fresnel lens 10a8, travel toward the second reflecting surface 10a3, are reflected by the second reflecting surface 10a3 toward the second entrance/exit surface 10a5, and are refracted at the second entrance/exit surface 10a5 at a second refraction angle so as to fall perpendicularly on the surface of the recording medium 50 provided with the position sensing track 50a.

Since the light beams K1, K2 and K3 are refracted at the second entrance/exit surface inclined at the predetermined second angle θ2 so as to travel perpendicularly to the first reflecting surface 10a2, the light beams K1, K2 and K3 are able to travel through the light passage 9b1 in the slider 9b of the magnetic head assembly 9.

The three light beams K1, K2 and K3 travel through the light passage 9b1 in the second magnetic head assembly 9 and fall on the position sensing track 50a of the recording medium 50. The respective intensities of three reflected light beams L1, L2 and L3, i.e., the three light beams K1, K2 and K3 reflected from the position sensing track 50a, are dependent on a condition in which the three light beams K1 K2 and K3 fall on the position sensing track 50a of the recording medium 50. The reflected light beams L1, L2 and L3 travel through the light passage 9b1 back to the holographic unit 10a.

The reflected light beams L1, L2 and L3 are refracted at the second entrance/exit surface 10a5 at the second refraction angle, travel into the optical path 10a1, and are reflected by the second reflecting surface 10a3 toward the Fresnel lens 10a8. The reflected light beams L1, L2 and L3 are condensed and deflected toward the beam splitter 10a7 by the Fresnel lens 10a8. The beam splitter 10a7 deflects the first-order diffracted light of each of the reflected light beams L1, L2 and L3 toward the first reflecting surface 10a2. The reflected light beams L1, L2 and L3 are reflected toward the first entrance/exit surface 10a4 by the first reflecting surface 10a2 and are refracted at the first entrance/exit surface 10a4 so as to travel toward the photodetection device 10c.

Upon the reception of the reflected light beams L1, L2 and L3, the photodetection device 10c sends detection signals representing the respective intensities of the reflected light beams L1, L2 and L3 to the controller 16 shown in FIG. 1.

With reference to FIG. 1, the controller 16 drives the carriage drive motor 14 on the basis of the detection signals to position the first magnetic head assembly 7 and the second magnetic head assembly 9 relative to a predetermined recording track of the recording medium 50.

As described above, in the magnetic recording apparatus 22 in the first embodiment, the holographic unit 10a of the optical unit 10 fixed to the magnetic head support structure 9c of the magnetic head assembly 9 has the optical path 10a1 defined by the first reflecting surface 10a2 and the second reflecting surface 10a3, which are parallel to each other, and the light beams travel zigzag through the optical path 10a1 of a sufficient length. Thus, the optical unit 10 is miniaturized by disposing the optical elements including the first optical diffraction grating 10a6, the beam splitter 10a7 and the Fresnel lens 10a8 in the optical path 10a1, and the light beams K1, K2 and K3 can be projected through the second entrance/exit surface 10a5 inclined at the second angle to the second reflecting surface 10a3 and the light passage 9b1 so as to fall on the surface of the recording medium 50 provided with the position sensing track 50a even if the recording medium 50 wavers. Therefore, mirrors and lenses need not be disposed between the second entrance/exit surface 10a5 and the recording medium 50, and the interval J between the second entrance/exit surface 10a5 and the recording medium 50 may be in the range of 2.0 mm to 2.5 mm, so that the magnetic recording apparatus can be formed in a relatively small thickness.

In the magnetic recording apparatus 22, the holder 10g is provided with the focus adjusting portion 10g1 which enables the light emitting-and-receiving unit 10d fixedly holding the holographic unit 10a capable of projecting the light beams K1, K2 and K3 perpendicularly on the recording medium 50 to be moved easily in directions perpendicular to the surface of the recording medium 50 provided with the position sensing track 50a. Therefore, the focus of the optical unit 10 can be easily adjusted.

In the magnetic recording apparatus 22, the focus adjusting portion 10g1 of the holder 10g serves also as an inclination setting means for setting the optical axes of the light beams K1, K2 and K2 emitted by the optical unit 10 onto the recording medium 50 so as to extend at an angle in the range of ±1° to a normal to the surface of the recording medium 50. Therfore, focus adjustment can be further facilitated, and the intensities of the light beams K1, K2 and K3 can be effectively used.

In the magnetic recording apparatus 22, the holder 10g is provided with the alignment adjusting recesses 10g2. Therefore, alignment adjustment for adjusting the positions of the spots of the light beams K1, K2 and K3 projected by the optical unit 10 onto the recording medium 50 and aligned in a straight line can be easily achieved.

In the magnetic recording apparatus 22, the magnetooptic head assembly 11 is formed by integrating the second magnetic head assembly 9 and the optical unit 10 by fixing the optical unit 10 to the magnetic head support structure 9c of the magnetic head assembly 9. Therfore, the position of the focus and the alignment of the light beams are not changed, and the magnetic recording apparatus can be easily carried around.

In the magnetic recording apparatus 22, the antireflection film 10a9 is formed on the surface of the holographic unit 10a facing the light emitting device 10b excluding the first entrance/exit surface 10a4. Therefore, the reflection of part of the light rays emitted by the light emitting device 10b and not travel through the optical path 10a1 can be prevented, and hence the adverse influence of light on the photodetection device 10c disposed near the light emitting device 10b can be prevented.

The effects and advantgages of the present invention may be summarized as follows.

According to the present invention, the magnetic recording apparatus comprises the magnetic head assembly for writing information to a disk-shaped recording medium or reading information recorded on the recording medium. The optical unit projects the light beams, through the light passage formed in the magnetic head assembly, on the recording medium and receives the reflected light beams reflected from the recording medium. The carriage mounted with the magnetic head assembly and the optical unit moves the magnetic head assembly and the optical unit. The controller drives the carriage on the basis of the intensities of the reflected light beams received by the optical unit to position the magnetic head assembly at a predetermined position. In this magnetic recording apparatus, the optical unit comprises the holographic unit, the light emitting device which projects a light beam on the holographic unit, and the photodetection device which receives the reflected light beams through the holographic unit and gives signals representing the intensities of the received light beams to the controller. The holographic unit comprises the optical path consisting of the first reflecting surface and the second reflecting surface extended in parallel to the first reflecting surface, and makes light to travel along a zigzag passage between the first and the second reflecting surface. The first optical diffracting means is disposed on the optical path to produce the plurality of light beams from the light beam emitted by the light emitting device. The second optical diffracting means is disposed on the optical path to deflect the light traveling along the optical path. The optical condensing means is disposed on the optical path to condense the light traveling along the optical path. The first entrance/exit surface is disposed at a predetermined first angle to the first reflecting surface to direct the light emitted by the light emitting device toward the first optical diffracting means. The second entrance/exit surface is disposed at the predetermined second angle to the second reflecting surface to project the plurality of light beams so that the plurality of light beams fall on the position sensing track perpendicularly to the surface of the recording medium. The holographic unit has the optical path defined by the first and the second reflecting surface, which are parallel to each other. The light beams travel zigzag through the optical path of a sufficient length. Thus, the optical unit is miniaturized by disposing the optical elements including the first optical diffraction grating, the beam splitter and the optical condensing means in the optical path, and the light beams can be projected through the second entrance/exit surface inclined at the second angle to the second reflecting surface and the light passage so as to fall on the surface of the recording medium provided with the position sensing track. Therefore, mirrors and lenses need not be disposed between the second entrance/exit surface and the recording medium, so that the magnetic recording apparatus can be formed in a relatively small thickness.

In another aspect of the present invention, the magnetic recording apparatus further comprises the holding unit for holding the optical unit, fixed to the support member to which the slider included in the magnetic head assembly is fixed. Therefore, the dislocation of the optical unit and the magnetic head assembly relative to each other can be avoded, and hence the change of the position of the focus can be prevented.

In another aspect of the present invention, the magnetic recording apparatus further comprises the focusing adjusting unit for adjusting the position of the holographic unit so that the light beams emitted from the second entrance/exit surface of the holographic unit are focused on the position sensing track of the recording medium. Therefore, the light beams emitted from the holographic unit can be easily focused.

In another aspect of the present invention, in the magnetic recording apparatus, the focusing adjusting unit is disposed on the holding unit for holding the optical unit. Therefore, focus adjustment for focusing the light beams emitted from the holographic unit can be efficiently and easily achieved.

In another aspect of the present invention, the magnetic recording apparatus further comprises the inclination control means for controlling the inclination of the holographic unit so that the optical axes of the light beams projected through the second entrance/exit surface of the holographic unit on the position sensing track of the recording medium extend at an angle of 90°±1° to the position sensing track, which further facilitates focus adjustment.

In another aspect of the present invention, in the magnetic recording apparatus, the inclination control means is included in the focusing adjusting unit. Therefore, the inclination of the holographic unit can be efficiently controlled in parallel to focus adjustment.

In another aspect of the present invention, in the magnetic recording apparatus, the plurality of light beams in a straight line are emitted through the second entrance/exit surface of the holographic unit, the positions of the plurality of light beams relative to the position sensing track of the recording medium are adjusted by the alignment adjusting unit. Therefore, the position of the plurality of light beams relative to the position sensing track can be easily adjusted.

In another aspect of the present invention, in the magnetic recording apparatus, the alignment adjusting unit is held on the holding unit for holding the optical unit. Therefore, the positions of the light beams emitted by the optical unit onto the position sensing track can be efficiently adjusted.

In another aspect of the present invention, in the magnetic recording apparatus, the holographic unit has the shape of a plate and is transparent, and the second entrance/exit surface of the holographic unit lies at a distance in the range of 2.0 mm to 2.5 mm from a sliding surface of the magnetic head assembly. Therefore, the magnetic recording apparatus can be formed in a relatively small thickness.

In another aspect of the present invention, in the magnetic recording apparatus, the surfaces of the holographic unit facing the light emitting device excluding the first entrance/exit surface is coated with the antireflection film capable of preventing the reflection of light of a wavelength emitted by the light emitting device. Therefore, the reflection of part of the light emitted by the light emitting device not traveling through the optical path can be prevented, and hence the light receiving device is not subject to adverse influence. The antireflection film is preferably a mat-finished black coating. Thus, reflection can be prevented by a simple means.

Obviously many modifications and variations of the present invention are possible in the light of the above teachings. It is therefore to be understood that within the scope of the appended claims the invention may by practiced otherwise than as specifically described.

What is claimed is:

1. A magnetic recording apparatus comprising:
    a magnetic head assembly for writing information to a disk-shaped recording medium or reading information recorded on the recording medium;
    an optical unit which projects light beams through a light passage formed in the magnetic head assembly on the recording medium and receives reflected light beams reflected from the recording medium;

a carriage mounted with the magnetic head assembly and the optical unit to move the magnetic head assembly and the optical unit;

a controller which drives the carriage on the basis of the intensities of the reflected light beams received by the optical unit to position the magnetic head assembly at a predetermined position;

said optical unit comprising:
a holographic unit,
a light emitting device which projects a light beam on the holographic unit, and
a photodetection device which receives the reflected light beams through the holographic unit and gives signals representing the intensities of the received light beams to the controller; and
said holographic unit comprising:
an optical path consisting of a first reflecting surface and a second reflecting surface extended in parallel to the first reflecting surface and capable of making light to travel along a zigzag passage between the first and the second reflecting surface,
a first optical diffracting means disposed on the optical path to produce a plurality of light beams from a light beam emitted by the light emitting device,
a second optical diffracting means disposed on the optical path to deflect the light traveling along the optical path,
an optical condensing means disposed on the optical path to condense the light traveling along the optical path,
a first entrance/exit surface disposed at a predetermined first angle to the first reflecting surface to direct the light emitted by the light emitting device toward the first optical diffracting means, and
a second entrance/exit surface disposed at a predetermined second angle to the second reflecting surface to project the plurality of light beams so that the plurality of light beams fall on a position sensing track perpendicularly to the surface of the recording medium.

2. The magnetic recording apparatus according to claim 1 further comprising a holding unit for holding the optical unit, said holding unit being fixed to a support member to which a slider included in the magnetic head assembly is fixed.

3. The magnetic recording apparatus according to claim 2 further comprising a focusing adjusting unit for adjusting the position of the holographic unit so that the light beams emitted from the second entrance/exit surface of the holographic unit are focused on the position sensing track of the recording medium.

4. The magnetic recording apparatus according to claim 3, wherein the focusing adjusting unit is disposed on the holding unit for holding the optical unit.

5. The magnetic recording apparatus according to claim 3 further comprising an inclination control means for controlling the inclination of the holographic unit so that the optical axes of the light beams projected through the second entrance/exit surface of the holographic unit on the position sensing track of the recording medium extend at an angle of 90°±1° to the position sensing track.

6. The magnetic recording apparatus according to claim 5, wherein the inclination control means is included in the focusing adjusting unit.

7. The magnetic recording apparatus according to claim 2, wherein a plurality of light beams are emitted from the second entrance/exit surface of the holographic unit so as to travel along a straight line, and the positions of the plurality of light beams relative to the position sensing track of the recording medium are adjusted by an alignment adjusting unit.

8. The magnetic recording apparatus according to claim 7, wherein the alignment adjusting unit is held on the holding unit for holding the optical unit.

9. The magnetic recording apparatus according to claim 1 further comprising a focusing adjusting unit for adjusting the position of the holographic unit so that the light beams emitted from the second entrance/exit surface of the holographic unit are focused on the position sensing track of the recording medium.

10. The magnetic recording apparatus according to claim 9, wherein the focusing adjusting unit is disposed on the holding unit for holding the optical unit.

11. The magnetic recording apparatus according to claim 9 further comprising an inclination control means for controlling the inclination of the holographic unit so that the optical axes of the light beams projected through the second entrance/exit surface of the holographic unit on the position sensing track of the recording medium extend at an angle of 90°±1° to the position sensing track.

12. The magnetic recording apparatus according to claim 11, wherein the inclination control means is included in the focusing adjusting unit.

13. The magnetic recording apparatus according to claim 1, wherein a plurality of light beams are emitted from the second entrance/exit surface of the holographic unit so as to travel along a straight line, and the positions of the plurality of light beams relative to the position sensing track of the recording medium are adjusted by an alignment adjusting unit.

14. The magnetic recording apparatus according to claim 13, wherein the alignment adjusting unit is held on the holding unit for holding the optical unit.

15. The magnetic recording apparatus according to claim 1, wherein the holographic unit has the shape of a plate and is transparent, and the second entrance/exit surface of the holographic unit lies at a distance in the range of 2.0 mm to 2.5 mm from a sliding surface of the magnetic head assembly.

16. The magnetic recording apparatus according to claim 1, wherein the surface of the holographic unit facing the light emitting device excluding the first entrance/exit surface is coated with an antireflection film capable of preventing the reflection of light of a wavelength emitted by the light emitting device.

17. The magnetic recording apparatus according to claim 16, wherein the antireflection film is a mat-finished black coating.

* * * * *